June 30, 1964 B. W. ATKINSON 3,139,567
METHOD OF PERMANENTLY MAGNETIZING BODIES
Filed March 23, 1961 5 Sheets-Sheet 3

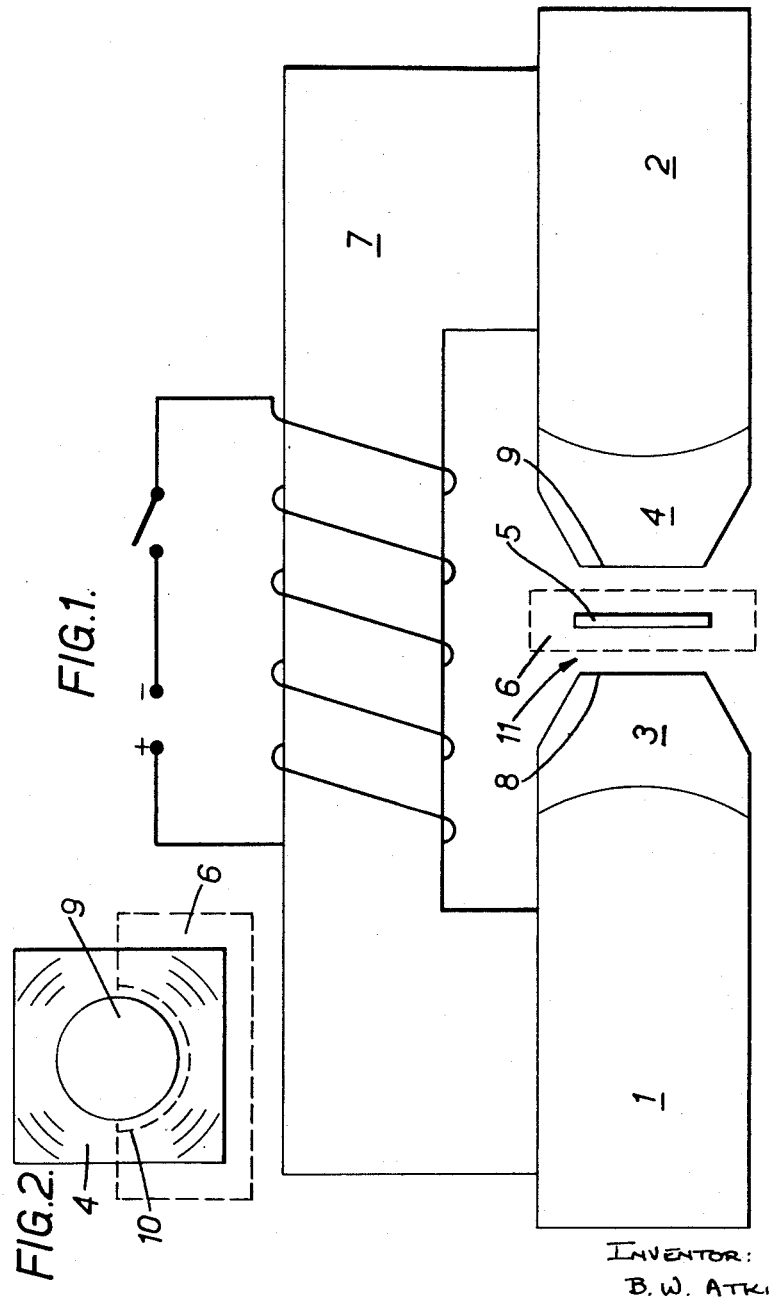

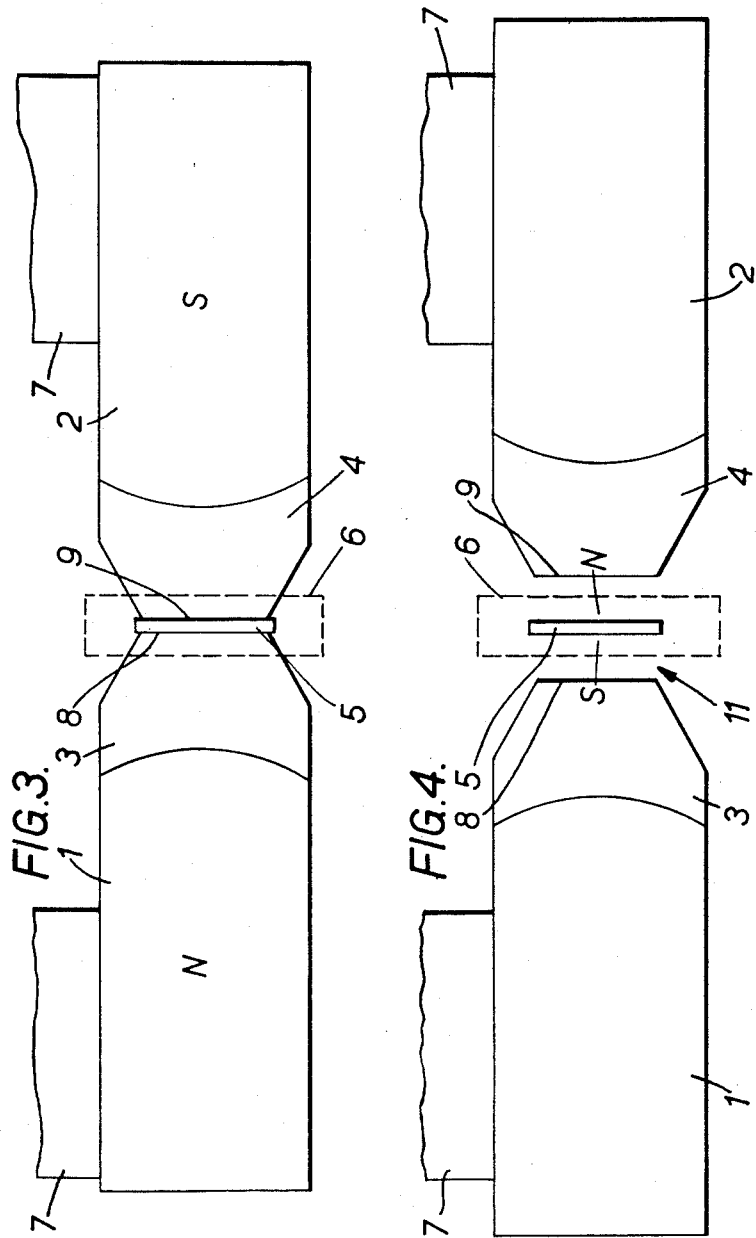

INVENTOR:
B.W. ATKINSON
BY: Moore J Hall
ATTORNEYS.

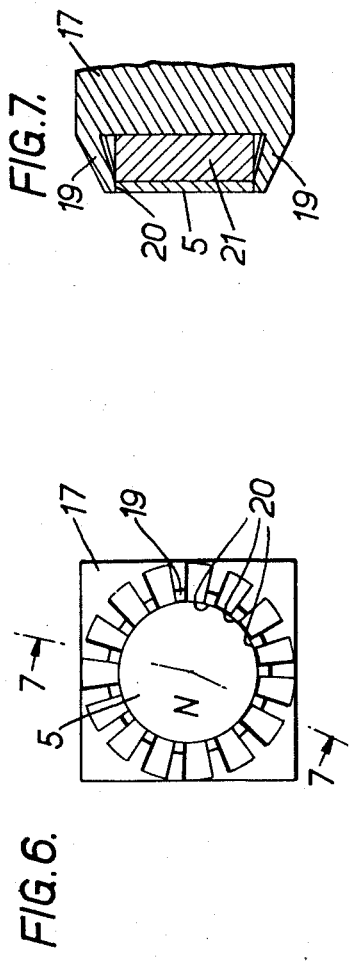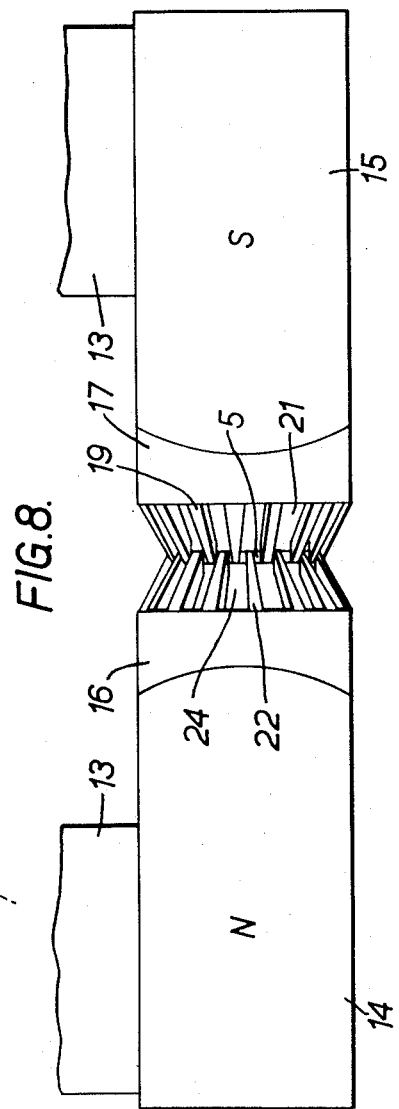

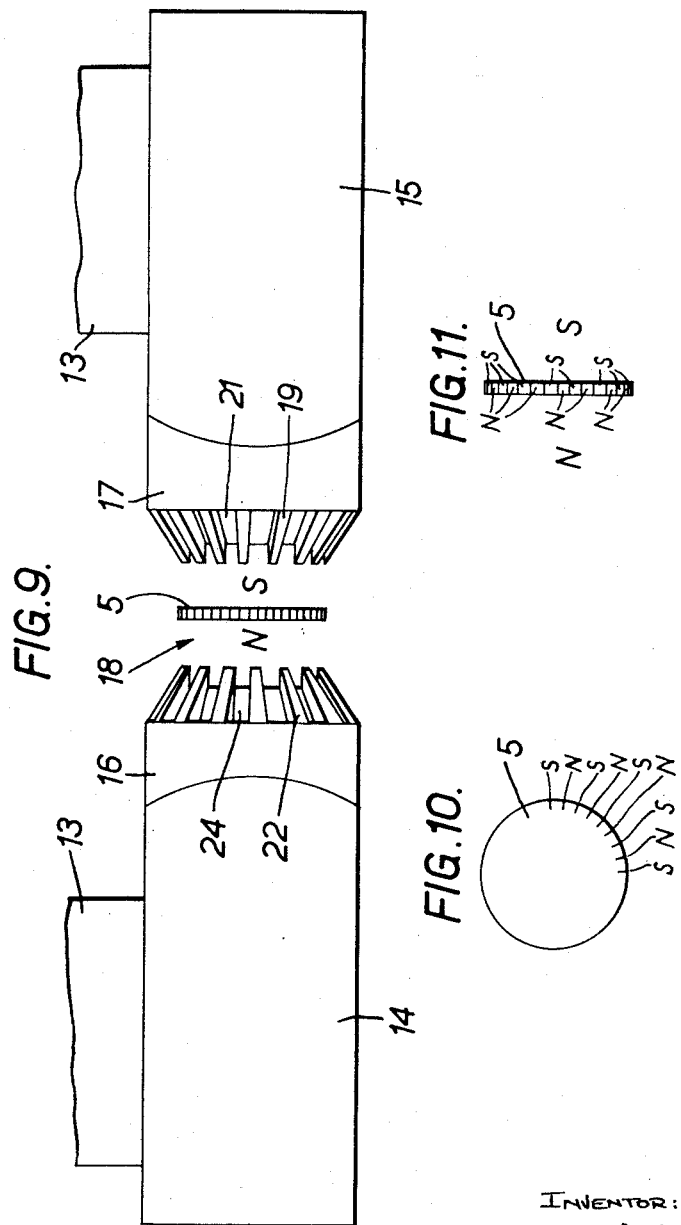

United States Patent Office 3,139,567
Patented June 30, 1964

3,139,567
METHOD OF PERMANENTLY MAGNETIZING BODIES
Bruce Wilton Atkinson, Clapham South, London, England, assignor to S. Smith & Sons (England) Limited, Cricklewood, London, England, a British company
Filed Mar. 23, 1961, Ser. No. 97,871
Claims priority, application Great Britain Mar. 25, 1960
7 Claims. (Cl. 317—203)

The present invention relates to permanently-magnetized bodies, and to methods of magnetizing such bodies. Such bodies are used, for example, as rotors in small synchronous motors such as are frequently used for driving clocks and various other timing mechanisms.

It is often desirable to have as high a value of intensity of magnetization as can conveniently be achieved and subsequently maintained in such bodies—for example, to give a high value of torque when used as a motor rotor; and it is an object of the present invention to provide such bodies having a relatively high intensity of magnetization.

According to one aspect of the present invention there is provided a method of magnetizing a permanently-magnetizable disc-shaped body so as to produce poles at a plurality of locations around the periphery comprising the steps of subjecting the body to a first magnetic field so as to polarize its opposed faces, and subsequently subjecting the body to a second magnetic field so as to polarize it in the required peripheral locations, concentration of the second field at the required peripheral locations being assisted by the polarization of the faces.

The invention is particularly applicable to bodies of magnetic material having a relatively high coercive force, such as ferromagnetic ferrites, in particular barium ferrite.

Accordingly another aspect of the invention resides in a permanently magnetized body magnetised by a method as set out above.

The magnetization of a rotor for a synchronous electric motor in accordance with the invention will now be described with reference to the accompanying drawings of which, FIGURE 1 is a plan view of some magnetizing apparatus, FIGURE 2 is an axial end view of pole piece 4 and jig 6 of the apparatus of FIGURE 1 from the direction of pole piece 3, FIGURES 3 and 4 are plan views of the same apparatus as FIGURE 1, but illustrating steps in the magnetization of the rotor, FIGURE 5 is a plan view of further magnetizing apparatus, FIGURE 6 is an axial end view of pole piece 17 of the apparatus of FIGURE 5 from the direction of pole piece 16, FIGURE 7 is a scrap cross-sectional view of pole piece 17 taken on the line 7—7 of FIGURE 6.

FIGURES 8 and 9 are plan views of the same apparatus as FIGURE 5 but illustrating further steps in the magnetization of the rotor.

FIGURES 10 and 11 are face and edge views respectively of the rotor 5 after it has been magnetized showing the disposition of the magnetic poles.

Figure 5:
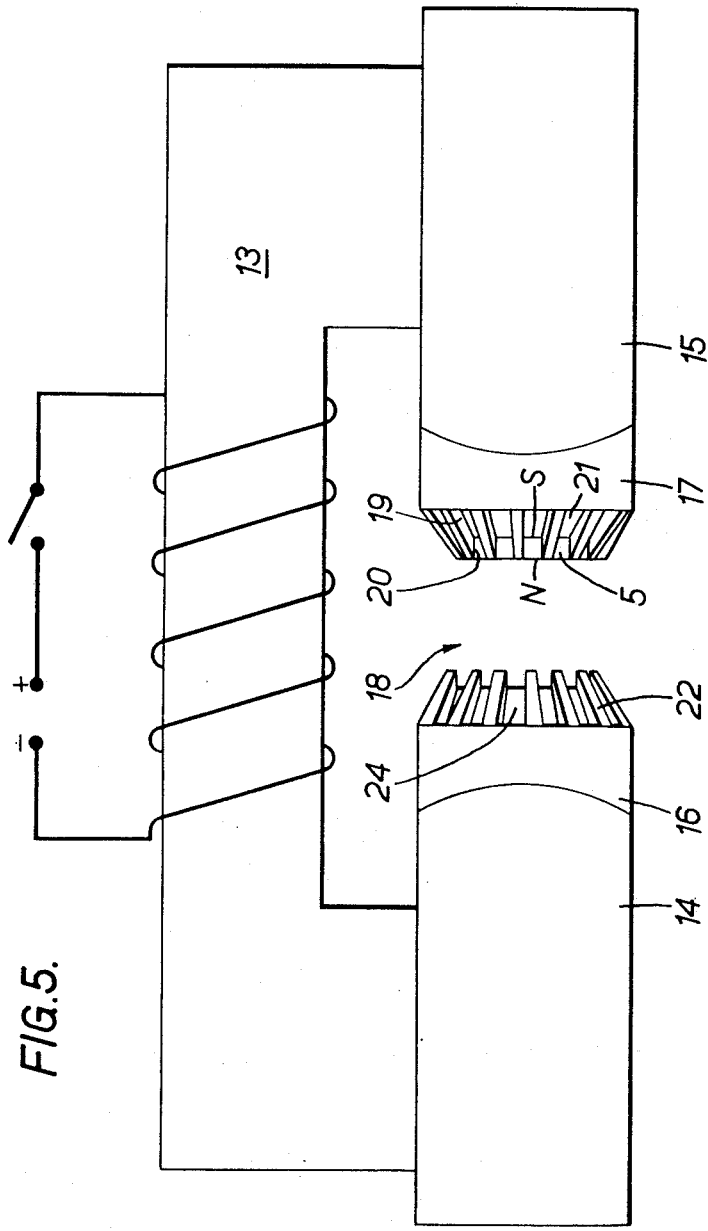

The rotor 5 which is to be magnetized is in the form of a disc made of finely divided barium ferrite bonded with a suitable thermosetting resin. The disc is 1.14" in diameter and 0.1" thick. An electromagnet indicated at 7 (FIGURE 1) is connected magnetically to two elongated ferromagnetic pole members 1 and 2 of square section which are placed in line, with a gap 11 between them. The pole members are slidable axially so as to change the dimensions of the gap without breaking their magnetic link with electromagnet 7. The pole members 1 and 2 have secured to their ends adjacent to the gap 11 ferromagnetic pole pieces 3 and 4 respectively. The pole pieces 3 and 4 terminate in circular pole faces 8 and 9 whose diameter is a little less than that of disc 5. Disc 5 is supported within the gap 11 by a brass jig 6 having a channel 10 of troughlike form to accommodate the disc so that its faces are parallel and symmetrical with respect to pole faces 8 and 9.

Referring now to the further magnetizing apparatus shown in FIGURE 5, two elongated ferromagnetic pole members 14 and 15 of square section are placed in line and separated by a gap indicated at 18. The pole members 14 and 15 are slidable axially and connected magnetically to an electromagnet indicated at 13. Pole member 14 terminates at the gap in a ferromagnetic pole piece 16, and member 15 similarly terminates in a ferromagnetic pole piece 17. Pole piece 17 has fifteen integral pole fingers 19 which project axially and are evenly spaced around a circle adjacent to the periphery of the pole piece as shown in FIGURE 6. Pole fingers 19 converge towards the common axis of the pole members and terminate in pole faces 20 which lie on a cylindrical surface co-axial with the common axis and of a diameter slightly greater than that of disc 5. The pole fingers 19 are undercut as shown in FIGURE 7. A brass disc 21 is secured to pole piece 17 within the pole fingers. Its thickness is such as to leave a space within the pole fingers of sufficient depth just to accommodate disc 5. Pole piece 16 similarly comprises fiften integral pole fingers 22 together with a similar brass disc 24. The fingers 19 of pole piece 17 lie opposite the spaces between the fingers 22 of pole piece 16.

The method of magnetization of rotor disc 5 will now be described. Referring to FIGURES 1 to 4, disc 5 is first placed in jig 6, then pole members 1 and 2 are advanced towards one another until pole faces 8 and 9 engage the circular faces of the disc symmetrically (jig 6 is suitably shaped to permit this). The electromagnet 7 is then energized to subject the disc to an intense magnetic field (of the order of 7,000 oersteds) so that the opposite faces of the disc are magnetized with opposite polarities. Electromagnet 7 is then deenergized, the pole members 1 and 2 are retracted, and the disc removed from jig 6.

Referring to FIGURES 5 to 9, rotor 5 is now placed adjacent to brass disc 21 within the pole fingers 19 of pole piece 17. The pole members 14 and 15 are moved together so that the pole faces of pole fingers 22 also lie adjacent to the edge of disc 5 as shown in FIGURE 8. It will be seen that pole fingers 19 then interdigitate with pole fingers 22. Electromagnet 13 is now energized in such a sense that the pole piece nearest to the face of disc 5 which has a north pole also becomes a north pole. The peripheral regions of disc 5 in the vicinity of the pole fingers 19 and 22 are subject to an intense field, the concentration of the field in these regions and therefore the intensity of magnetization produced being substantially increased by the existing magnetization of the disc.

Pole members 14 and 15 are now moved apart to release disc 5. The disposition of the poles is illustrated in FIGURES 10 and 11. The faces of the disc are polarized, and there are also thirty poles, alternately north and south, evenly distributed around the periphery. It is found that a rotor magnetized in the manner described has a substantially greater intensity of magnetization of the peripheral poles than would be the case if the first magnetizing step were omitted.

It will be appreciated that instead of employing the separate apparatus of FIGURES 5–9, the apparatus of FIGURES 1–4 could be suitably modified (by substitution of pole pieces) for the further steps in the magnetization of disc 5.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:
1. A method of magnetizing a permanently-magnetizable disc-shaped body so as to produce poles at a plurality of locations around the periphery comprising the steps of subjecting the body to a first magnetic field so as to polarize its opposed faces, and subsequently subjecting the body to a second magnetic field so as to polarize it in the required peripheral locations, concentration of the second field at the required peripheral locations being assisted by the polarization of the faces.

2. A method as claimed in claim 1 wherein the first magnetic field is supplied by an electro-magnet having circular pole faces which are placed in engagement with the faces of the disc, the pole faces having a slightly smaller diameter than the faces of the disc and being symmetrically placed with respect to them.

3. A method as claimed in claim 2 wherein the second magnetic field is supplied by an electro-magnet having pole pieces symmetrically spaced apart from the faces of the disc, projections from the pole pieces lying adjacent the periphery of the disc at the said locations, the projections from one pole piece interdigitating with those from the other, and the electromagnet being energized so that each pole piece has the same polarity as the opposed face of the disc.

4. A method as claimed in claim 3 wherein the body comprises a ferro-magnetic ferrite having a relatively high coercive force.

5. A method as claimed in claim 4 wherein the body comprises barium ferrite.

6. A disc-shaped body of material having a high coercive force, said body being permanently magnetized with opposed faces having poles of opposite sign and a plurality of poles of alternate polarity disposed about the periphery of said body.

7. A rotor for an electric motor comprising a disc-shaped body of a ferro-magnetic ferrite, said body having its opposed faces centrally magnetized in opposite senses and magnetized around its periphery to provide a plurality of successive poles of opposite polarity.

References Cited in the file of this patent
UNITED STATES PATENTS

| | | |
|---|---|---|
| 2,536,227 | Rozett | Jan. 2, 1951 |
| 2,722,617 | Cluwen et al. | Nov. 1, 1955 |
| 2,764,716 | Minchom | Sept. 25, 1956 |